(12) United States Patent
Lamparter

(10) Patent No.: US 6,421,713 B1
(45) Date of Patent: Jul. 16, 2002

(54) PROCESS AND SYSTEM FOR TRACING DOCUMENTS IN AN INTERLOCKING COMPUTER SYSTEM

(75) Inventor: Bernd Lamparter, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/310,605

(22) Filed: May 12, 1999

(30) Foreign Application Priority Data

May 15, 1998  (DE) .......................................... 198 21 876

(51) Int. Cl.$^7$ .............................................. G06F 13/00
(52) U.S. Cl. ...................................................... 709/216
(58) Field of Search .................. 707/10, 104; 709/246, 709/205, 216; 711/113, 122

(56) References Cited

U.S. PATENT DOCUMENTS

| | | | | | |
|---|---|---|---|---|---|
| 5,864,852 A | * | 1/1999 | Luotonen | ...................... | 707/10 |
| 5,924,116 A | * | 7/1999 | Aggarwal et al. | ........... | 711/122 |
| 6,292,880 B1 | * | 9/2001 | Mattis et al. | ................ | 711/216 |

* cited by examiner

*Primary Examiner*—Robert B. Harrell
(74) *Attorney, Agent, or Firm*—Carstens, Yee & Cahoon, LLP; A. Bruce Clay

(57) ABSTRACT

Documents down-loaded for the first time from the Internet onto an interlocked computer system are stored on an allocated computer in an interlocked computer system. By using a HASH function, a computer in the system is determined, using the document address. On this computer there are stored the document address and the address of the computer on which the document is stored. The HASH function can ensure that either all computers are used equally to store the address information for the documents stored in the interlocked computer system, or it can take into consideration differing capacities of the individual computers in storage of the address information items. When future requests are made for a document stored in the interlocked computer system, the HASH function determines from the document address the appropriate computer. The relevant computer passes the document request to the computer on which the document is stored. Consequently, it is a simple technical step to transfer the document to the user. This ensures that document requests are always addressed directly to the correct computer in the interlocked computer system. As a result, computers in the system are not blocked by unnecessary document requests.

33 Claims, 2 Drawing Sheets

PROCESS AND SYSTEM FOR TRACING DOCUMENTS IN AN INTERLOCKING COMPUTER SYSTEM

TECHNICAL FIELD

The present invention describes a process for tracing documents in an interlocking computer system, and in particular a proxy-server interlocking system.

BACKGROUND OF THE INVENTION

Modern Internet browsers enable one to introduce a proxy-server when requesting documents from the Internet. Normally the proxy-servers are equipped with a cache, so that documents frequently requested do not have to be fetched from the Internet freshly on each occasion. For major server providers or businesses this means an enormous saving of band width when connected to the Internet.

The caches can be linked with each other in the following ways:

Parent-relation: There are several small caches and a large central cache. If a proxy-server does not have a document requested in its own cache, it turns to its parent proxy-server, which fetches the document from its own cache or from the Internet.

Sibling-relation: If a proxy does not have a certain document in its cache, it interrogates one or more siblings, to see if they have this document already in their cache. If the answer is positive, it collects the document from the relevant sibling but otherwise from the Internet.

These two processes are very suitable if the parent-cache-proxy is not overloaded or if the number of siblings remains reasonable. It is not in practice reasonable, for example, to ask 20 siblings for a certain document. Also, the individual parent cache will be overloaded if it has to deal with queries from 20 powerful proxy-servers.

Another way of solving the problem of tracing documents is provided by the CARP protocol from Microsoft. This protocol is installed on every proxy-server and makes it possible to trace the documents stored on the proxy-servers. In this case the query from the user is routed via a hash function to an appropriate proxy-server, where the document is also stored. One disadvantage of this process is that if the documents are not in the interlinked proxy-server system, a second server is involved unnecessarily. The documents requested always have to be transferred from this server to the server interrogated by the user.

SUMMARY OF THE INVENTION

Consequently, it is the task of the present invention to provide a process and system making it possible to rapidly and simply trace documents stored in an interlocked computer system. This task is covered by the characteristics of claims 1, 14 and 15. Other preferred versions of the present invention are described in the sub-claims.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

The basic idea of this invention is that one should consider the existing proxy-servers simultaneously as a global cache.

As soon as a proxy-server receives a document into its cache, this information is entered in a globally accessible index. If a different proxy-server receives a request for this document, it can search for the document in the global index and obtain it from the first proxy-server.

The following possibilities exist for constructing the global index:

Central: a single computer stores the global index.

Disadvantages:
  If this computer breaks down, the index is no longer available.
  The computer or its network access can easily become a bottleneck.
  There is no scale facility with the number of the proxy-servers.

Distributed: Part of the global index is stored on each proxy-server.

Disadvantages:
  More complex administration of the index.
  Increased probability of breakdown, although this would only affect part of the index.

The task of the present invention is to distribute the global index in such a way that the correct proxy-server is always interrogated. This is achieved by means of a HASH function which in a clear manner specifies from the URL one of the proxies. For this purpose, for example, several characters are taken from the URL, interpreted as figures and linked with a mathematical function. From the result, the modulus referring to the number of proxies is taken. Consequently, each proxy, after a document is stored, can allocate the URL to a distinct proxy. This receives the URL in its part of the global cache. Now if the exact same document is requested from a different proxy-server, by virtue of the clear HASH function that proxy-server will interrogate the same proxy-server and obtain the address of the proxy which already has the document in its cache.

It can collect the document directly from the correct proxy-server.

Figure 1:
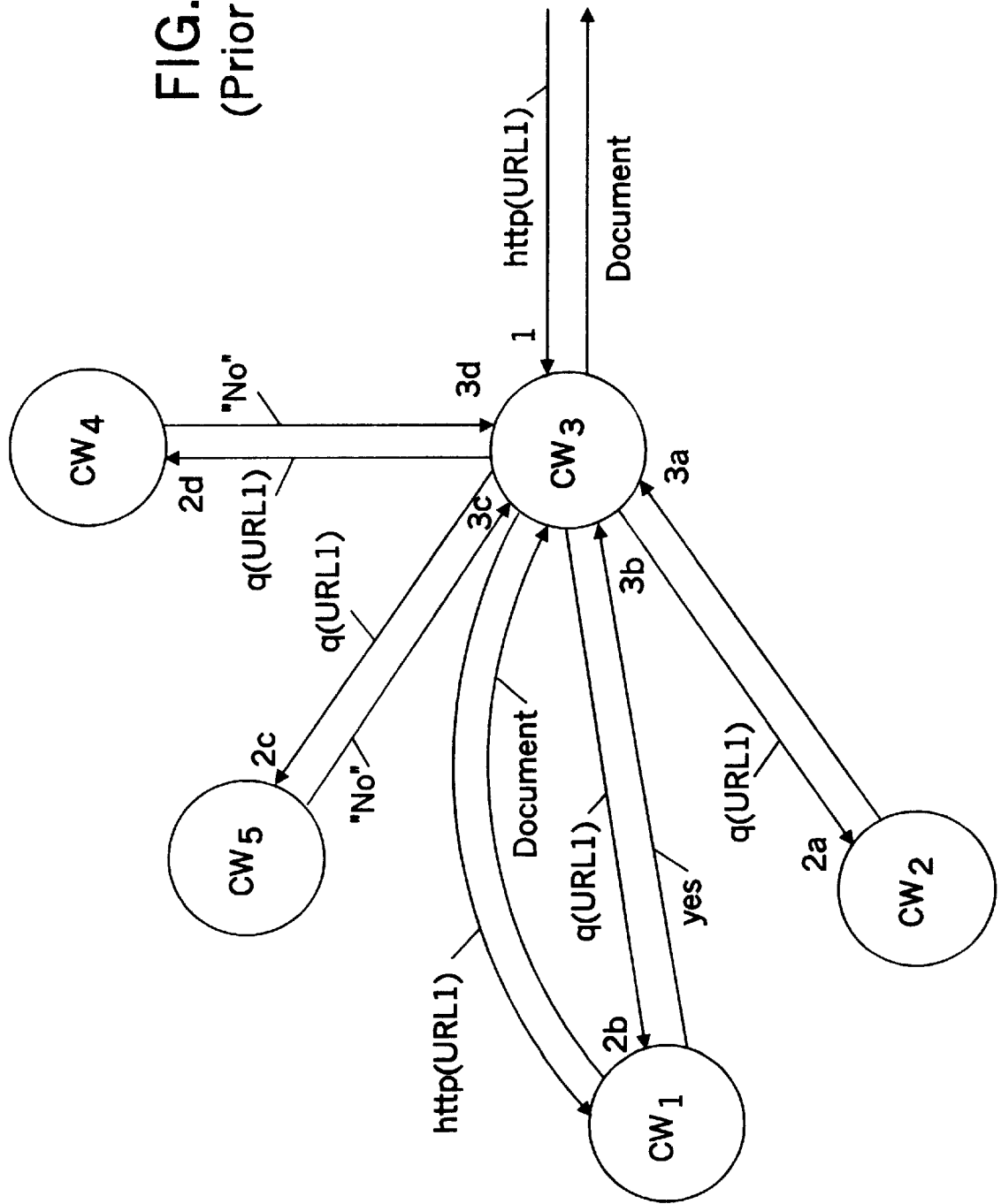
FIG. 1 shows a process for tracing documents in an interlinked computer system in accordance with the prior art.

FIG. 1 shows a prior art process in which documents from the Internet are called via a proxy-server-interlinked system. The user sends a request, which specifies a certain document, via an allocated proxy-server CW3. The allocated proxy-server CW3 then asks the proxy-servers CW1, CW2, CW4 and CW5 allocated to it whether the document requested exists on one of those proxy-servers. If none of the proxy-servers has the document requested, the document is requested from the Internet. The document requested is stored on the proxy-server CW3 and dispatched to the user.

Should the document already be stored on one of the allocated proxy-servers, in the present case being CW1, the document is transferred from this proxy-server CW1 to proxy-server CW3 and from there to the user.

Figure 2A:
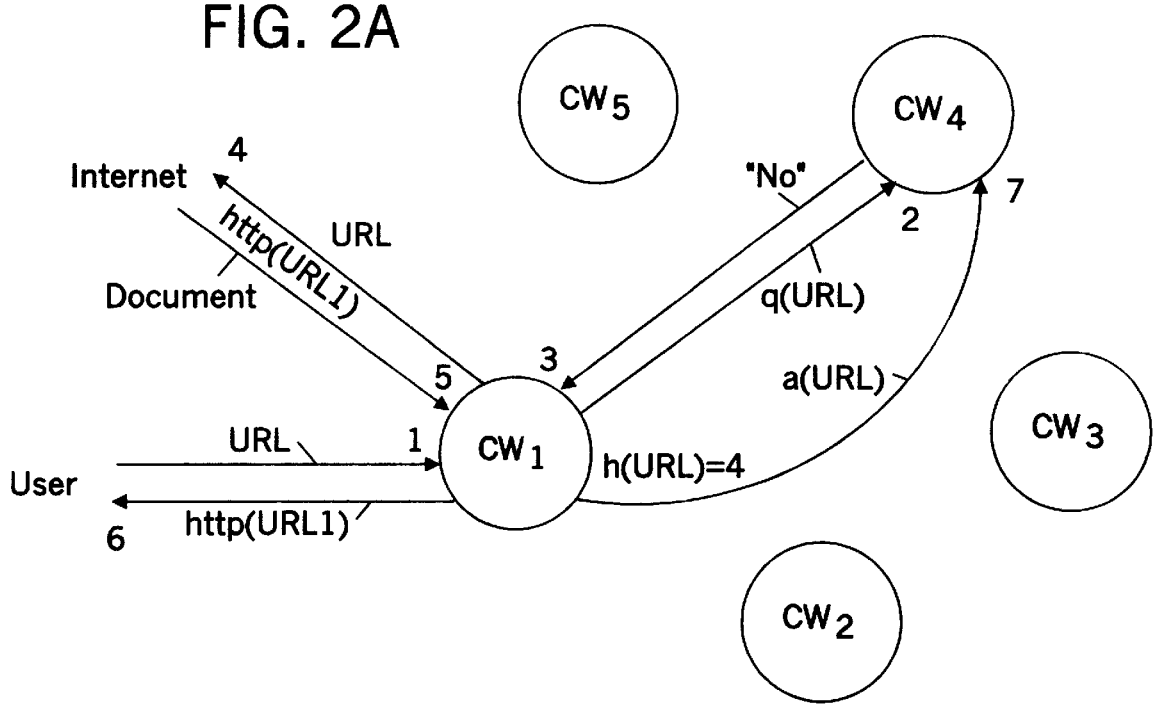
FIG. 2A shows the process of the invention as regards the entry of a document in the global index.

FIG. 2A describes the process of the present invention for tracing documents in an inter-locked computer system, particularly a proxy-interlinked system CW1–CS5 where the document requested is not located on one of the proxy servers CW1–CW5.

The user specifies a document request using a URL (Universal Resource Locator) and sends this to a proxy-server CW1 which is allocated to him. Each of the proxy-servers CW1–CW5 in the proxy-server-interlinked system, on which information about the address of the proxy-server is stored, where the document requested is stored. In the present example the proxy-server CW4 has been selected by the HASH function.

If there is no information on the server selected by the HASH function about the address of a server on which the document is stored, this means that none of the proxy-servers has stored this document. In this case the document must be obtained from the Internet. The document obtained from the Internet is stored on the proxy-server CW1 and the proxy-server CW4 chosen by the HASH function receives the address of proxy-server CW1, where the document is stored. Simultaneously, the document is sent by proxy-server CW1 to the user.

Figure 2B:
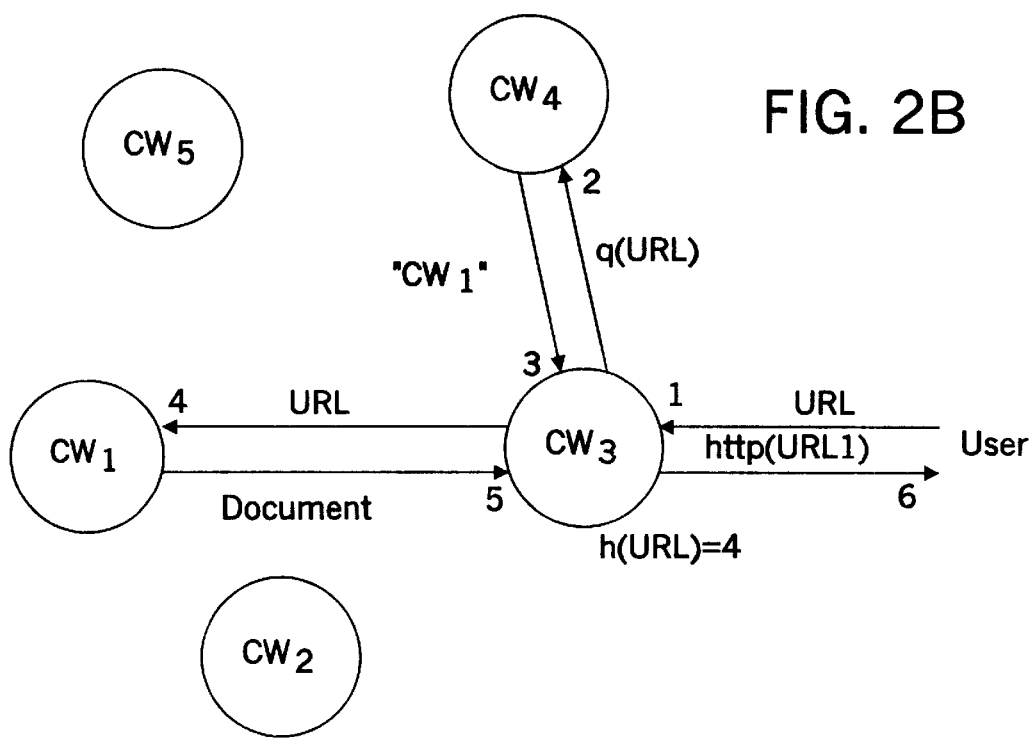
FIG. 2B shows the desired document being called up, using the process of the invention.

FIG. 2B describes the process of the present invention where the document requested is already on one of the proxy-servers CW1–CW5.

The user specifies a document request by means of URL 1 and sends this to the proxy-server CW3 allocated to him. The proxy-server CW3 selects or calculates from URL 1 by means of the HASH function proxy-server CW4 from the proxy-server-interlinked system.

Since the HASH function is the same for all proxy-servers in the proxy-server-interlinked system, this must again be proxy-server CW4. On this proxy-server CW4 and only on this proxy-server, is stored the address of the proxy-server on which the document is actually stored. In the present case, it is proxy-server CW1.

The document requested is transferred from proxy-server CW1 to proxy-server CW3 and made available to the user.

The present invention differs from other processes in that a global index is constructed for the individual proxy-server-interlinked system, for all documents stored in the proxy-server-interlinked system. This global index is distributed around the proxy-server-interlinked system by means of a HASH function.

The HASH function ensures that the distribution of the index is made evenly over all proxy-servers, or according to their capacities. The advantage of this is that on each occasion only one request is made to the proxy-server specified by the HASH function. In contrast to this, other processes require a request to each server. If one assumes a large interlinked system of about 50 proxy-servers with 50 requests per second, 2,450 requests would reach each proxy-server every second. This means that the proxy-servers are completely overloaded A further version of the present invention can be one in which the configuration depicted above is expanded by one or more proxy-servers. The consequence of this is that the previous global index has to be restructured by a new HASH function which takes into consideration the expanded proxy-servers. For this there are the following possibilities:

Scrapping of the entire index (deletion of the index) and implementation of a new HASH function.

Use of a new HASH function and retention of the old index.

Document and addresses are entered in accordance with the new HASH function; in a transition period, requests are performed by both the new and old HASH function. Once in practical terms no requests with the old function result in a positive answer, the old function is no longer used.

Adaptation of the entire index to the proxy-server configuration.

In the event of breakdown of one or more proxy-servers, a further version of the present invention includes a timer, which automatically passes the request to the Internet in the event of a response time being exceeded by the proxy-server. If the proxy-server were to be out of action for an extended period, a new HASH function would have to be used and the index structure would have to be adjusted in accordance with the alternatives mentioned above.

Storage of the index information item requires at least the address of the document requested and the proxy-server upon which this document is stored.

In an alternative solution, the expiration date and date of last access to the document can additionally be stored as index information items.

The URLs can take up a large portion of the main memory. Consequently, it is useful to tore only a HASH figure in place of the URL. The figure must be large enough to ensure the probability that two different URLs produce the same HASH figure is so slight that the expectation figure for the number of identical HASHes is below 1. The expectation figure for identical HASHes e(n,m) with n URLs and m possible HASH figures is:

$$e(n, m) \overset{i=n}{\underset{i=n}{S}} i/m = n*(n+1)/m$$

Thus if, for example, one million URLs are stored, the figure range for the HASH should be approximately $10^{12}$ in extent, i.e. five bytes. With an average document size of 8 Kbytes, this produces a cache of 8 Gbytes. The main memory for the URLs drops simultaneously from approximately 120 Mbytes to five Megabytes.

The present invention can be implemented without significant alterations to existing programs. As a rule on the proxy-servers there is a proxy-software (e.g. for IBM WTE (WEB Traffic Express)). This proxy-software is expanded at the following two places:

First place: if a document is not in the local cache a request is directed to the global index (calculation of the HASH function and sending of a request to the corresponding proxy-server) and by means of the index information items, the document is fetched from another proxy-server or from the Internet.

Second place: after a document has been fetched from the Internet by a proxy-server, the HASH function is used to set up an index on a specified proxy-server, containing at least the address of the document requested and the relevant proxy-server address where the document is stored.

In addition, on each proxy-server a program is started which undertakes index entries and answers the requests from proxy-servers.

Although the present invention has been described with respect to a specific preferred embodiment thereof, various changes and modifications may be suggested to one skilled in the art and it is intended that the present invention encompass such changes and modifications as fall within the scope of the appended claims.

What is claimed:

1. A computer program product recorded on computer readable medium for transferring a document from an interlocked computer system (CW1–CW5) to an interrogation system, in which the document is stored on a computer in the interlocked computer system and/or on a computer in a computer network, while the interlocked computer is linked to the interrogation system and the computer network via a data link, the product comprising:

a) Computer readable means for inputting a document-address (URL) for down-loading of a document from a computer (CW1; CW3) of an interlocked computer system to an interrogation system;

b) Computer readable means for sending the address (URL) to an allocated computer (CW1; CW3) in the interlocked computer system;

c) Computer readable means for determining from the address by application of a HASH function of a specific computer in the interlocked computer system (CW4);

d) Computer readable means for checking with the computer specified in stage (c) (CW4) for the presence of address information items, whether the document requested is stored on any computer in the interlocked system;

e) if address information items for the document requested are available:
   aa) Computer readable means for initiating a transfer of the document requested from this computer to the interrogation system;

f) if no address information items are available:
   aa) Computer readable means for down-loading the document requested from a computer in the computer net-work onto a computer (CW1) in the interlocked computer system;
   bb) Computer readable means for transferring the document to the interrogation system;
   cc) Computer readable means for determining from the address (URL) by application of a HASH function of a specified computer (CW4) in the interlocked computer system; and
   dd) Computer readable means for storing the document address (URL) and the computer address (CW1) where this document is stored, in the computer as in stage (cc).

2. The computer program product of claim 1, characterized in that the interlocked computer system (CW1–CW5) is a proxy-server system and the computer network is the Internet.

3. The computer program product of claim 2, characterized in that the allocated computer (CW1–CW3) in accordance with stage (b) is the proxy-server for the request system.

4. The computer program product of claim 3, characterized in that each proxy-server (CW1–CW5) uses the same HASH function.

5. The computer program product of claim 4, characterized in that the HASH function ensures that all computers are used equally in the selection method under stage (c).

6. The computer program product of claim 5, characterized in that the HASH function ensures that the computers are used in accordance with their capacities in the selection process as in stage (c).

7. The computer program product of claim 6, characterized in that the document address is a URL.

8. The computer program product of claim 7, characterized in that in addition to the address information items as in stage (dd), the expiration date and date of last access of the document are also stored.

9. The computer program product of claim 8, characterized in that the HASH figure of the document address (URL) of the document is stored in accordance with stage (dd).

10. The computer program product of claim 9, characterized in that in the event of breakdown of a computer (CW1–CW5) of the interlocked computer system, a timer is activated which, if a prescribed response time is exceeded, down-loads the document requested from the Internet onto a computer in the interlocked computer system.

11. The computer program product of claim 10, characterized in that in the event of breakdown of a computer in the interlocked computer system, a new HASH function is implemented for the new configuration of the interlocked computer system on each computer.

12. The computer program product of claim 9, characterized in that with expansion of the interlocked computer system (CW1–CW5) all address information items on all computers in the system are deleted and a new HASH function is implemented on all computers in the system and the old HASH function is deleted.

13. The computer program product of claim 9, characterized in that with expansion of the interlocked computer system a new HASH function is implemented on all computers in the system and the old HASH function is deleted.

14. The computer program product of claim 9, characterized in that with expansion of the interlocked computer system a new HASH function is implemented and during a transition period, both the old and the new HASH function are used.

15. The computer program product of claim 9, characterized in that the address information items are adapted to the new computer configuration.

16. A method for transferring a document from an interlocked computer system (CW1–CW5) to an interrogation system, in which the document is stored on a computer in the interlocked computer system and/or on a computer in a computer network, while the interlocked computer network via a data link, comprising the following steps:

a) imputing a document-address (URL) for down-loading of a document from a computer (CW1; CW3) of an interlocked computer system to an interrogation system;

b) sending the address (URL) to an allocated computer (CW1; CW3) in the interlocked computer system;

c) determining from the address by application of a HASH function of a specific computer in the interlocked computer system (CW4);

d) checking with the computer specified in stage (c) (CW4) for the presence of address information items, whether the document requested is stored on any computer in the interlocked computer system;

e) if address information items for the document requested are available:
   aa) initiating a transfer of the document requested from this computer to the interrogation system;

f) if no address information items are available:
   aa) down-loading the document requested from a computer in the computer net-work onto a computer (CW1) in the interlocked computer system;
   bb) transferring the document to the interrogation system;
   cc) determining from the address (URL) by application of a HASH function of a specified computer (CW4) in the interlocked computer system; and
   dd) storing the document address (URL) and the computer address (CW1) where this document is stored, in the computer as in stage (cc).

17. The method of claim 16, characterized in that the allocated computer (CW1–CW3) in accordance with stage (b) is the proxy-server for the request system.

18. The method of claim 17, characterized in that the HASH function ensures that the computers are used in accordance with their capacities in the selection process as in stage (c).

19. The method of claim 18, characterized in that the document address is a URL.

20. The method of claim 19, characterized in that in addition to the address information items as in stage (dd), the expiration date and date of last access of the document are also stored.

21. The method of claim 20, characterized in that the HASH figure of the document address (URL) of the document is stored in accordance with stage (dd).

22. The method of claim 21, characterized in that the address information items are adapted to the new computer configuration.

23. The method of claim 22, characterized in that in the event of breakdown of a computer (CW1–CW5) of the interlocked computer system, a timer is activated which, if a prescribed response time is exceeded, down-loads the document requested from the Internet onto a computer in the interlocked computer system.

24. The method of claim 22, characterized in that in the event of breakdown of a computer in the interlocked computer system, a new HASH function is implemented for the new configuration of the interlocked computer system on each computer.

25. The method of claim 21, characterized in that with expansion of the interlocked computer system (CW1–CW5) all address information items on all computers in the system are deleted and a new HASH function is implemented on all computers in the system and the old HASH function is deleted.

26. The method of claim 21, characterized in that with expansion of the interlocked computer system a new HASH function is implemented on all computers in the system and the old HASH function is deleted.

27. The method of claim 21, characterized in that with expansion of the interlocked computer system a new HASH function is implemented and during a transition period, both the old and the new HASH function are used.

28. The method of claim 17, characterized in that each proxy-server (CW1–CW5) uses the same HASH function.

29. The method of claim 17, characterized in that the HASH function ensures that all computers are used equally in the selection method under stage (c).

30. The method of claim 16, characterized in that the interlocked computer system (CW1–CW5) is a proxy-server system and the computer network is the Internet.

31. A method for down-loading of a document from the Internet onto a computer in an interlocked computer system, comprising the following steps:

(a) sending a URL of a document requested via an allocated computer (CW1) of the interlocked computer system (CW1–CW5) to the Internet;

(b) down-loading the document requested from the Internet onto the allocated computer (CW1);

(c) determining from the URL and via a HASH function a computer address identifying a computer in the interlocked computer system, wherein the HASH function provides a distribution of computer addresses across the interlocked computer system that is based on storage capacities of individual computers in the interlocked computer system; and (d) storing the URL and the computer address on the computer associated with the computer address.

32. The method of claim 31, further comprising the following steps:

a) sending the URL of a document requested to an allocated computer (CW3) in the interlocked computer system;

b) determining from the URL via a HASH function of a computer (CW4) in the interlocked computer system to hold the computer address (CW1) where this document is stored in the computer system;

c) calling the computer address (CW1) for this document from the computer (CW4) in accordance with stage (b); and d) transferring the document from the computer (CW1) named in accordance with stage (c) onto the request system.

33. An interlocked computer system comprising:

a plurality of computers, wherein:

a) communication software is installed on each of the plurality of computers, allowing information to be exported between computers of the plurality of computers; and b) a HASH function is installed on each computer of the plurality of computers, enabling a corresponding computer to be determined for each of a plurality of documents stored in the interlocked computer system, the corresponding computer being capable of holding at least the computer address for this document.

* * * * *